US012107817B1

(12) United States Patent
Su et al.

(10) Patent No.: US 12,107,817 B1
(45) Date of Patent: Oct. 1, 2024

(54) VIRTUALIZED EMAIL CONSOLIDATION AND CATEGORIZATION

(71) Applicant: International Business Machines Corporation, Armonk, NY (US)

(72) Inventors: Jun Su, Beijing (CN); Su Liu, Austin, TX (US); Luis Osvaldo Pizana, Austin, TX (US); Yang Liang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/483,605

(22) Filed: Oct. 10, 2023

(51) Int. Cl.
*H04L 51/42* (2022.01)
*H04L 51/212* (2022.01)

(52) U.S. Cl.
CPC ............ *H04L 51/42* (2022.05); *H04L 51/212* (2022.05)

(58) Field of Classification Search
None
See application file for complete search history.

(56) References Cited

U.S. PATENT DOCUMENTS

| 9,047,283 | B1 | 6/2015 | Zhang | |
|---|---|---|---|---|
| 10,063,509 | B2 | 8/2018 | Bastide | |
| 10,958,615 | B2 | 3/2021 | Abou Mahmoud | |
| 11,075,872 | B2 | 7/2021 | Gulik | |
| 11,637,798 | B2 | 4/2023 | Hassan | |
| 2011/0113427 | A1* | 5/2011 | Dotan | G06F 21/53 718/1 |
| 2016/0306812 | A1* | 10/2016 | McHenry | H04L 51/226 |
| 2019/0378024 | A1 | 12/2019 | Singh | |
| 2021/0250318 | A1* | 8/2021 | Kwon | H04L 51/04 |

FOREIGN PATENT DOCUMENTS

WO 2004086250 A1 10/2004

OTHER PUBLICATIONS

Anonymous, "An Intelligent Method of Email Consolidation and Deletion", an IP.com Prior Art Database Technical Disclosure, Original Publication Date: Sep. 20, 2006, IP.com No. IPCOM000140791D, IP.com Electronic Publication Date: Sep. 20, 2006, 3 pages.
Ho et al., "EMMA: An E-Mail Management Assistant", Proceedings of the IEEE/WIC International Conference on Intelligent Agent Technology (IAT'03), 8 pages.
(Continued)

*Primary Examiner* — Quang N Nguyen
(74) *Attorney, Agent, or Firm* — Daniel M. Yeates (57) ABSTRACT

A computer-implemented method dynamically categorizes email on a client device. The method includes identifying one or more email servers associated with a user. The method also includes analyzing, for the user, a set of emails associated with the one or more email servers. The method further includes identifying, for each email, at least one category based on the content of the email. The method includes generating at least one virtualized folder, and consolidating, in response to the generating, the set of emails into the at least one virtualized folder by moving the emails into a folder based on a first of the at least one categories.

20 Claims, 4 Drawing Sheets

(56) References Cited

OTHER PUBLICATIONS

Jain et al., "A Method and System for Highlighting Topics in Online Conversations", an IP.com Prior Art Database Technical Disclosure, IP.com No. IPCOM000240222D, IP.com Electronic Publication Date: Jan. 14, 2015, 3 pages, Copyright: Yahoo! 2015. All rights reserved.

Khare et al., "E-Mail Assistant—Automation of E-Mail Handling and Management using Robotic Process Automation", 2022 International Conference on Decision Aid Sciences and Applications (DASA), 2022, pp. 511-516, doi:10.1109/DASA54658.2022.9765017, https://doi.org/10.1109/DASA54658.2022.9765017.

Pollak et al., "E-Mail Monitoring and Management with MS Social Bots", iiWAS '17, Dec. 4-6, 2017, Salzburg, Austria, © 2017 Association for Computing Machinery, 7 pages, https://doi.org/10.1145/3151759.3151799.

* cited by examiner

| UserID | Email [ServerID] [EmailID] | VirtualCategory [VirtualCategoryID] [CategoryName][EmailList] | Thread[EmailID][EmailLIST[EMAILID]] |
|---|---|---|---|
| USER01 | Email [EmailServer-01] [Email01]: Subject="Thank you for your application for Senior Brand & Content Strategist"; Sender=Enterprise@trm.brassring.com Content="We're excited you've taken the next steps in growing your career at ..." | VirtualCategory [Job-1] ["Applied"][Email01] | Thread [Email01] [EmailLIST[NULL]] |
| USER01 | Email [EmailServer-01] [Email02]: Subject="Thank you for your application for Senior Brand & Content Strategist"; Sender=Enterprise@trm.brassring.com Content="We're excited you've taken the next steps in growing your career at ..." | VirtualCategory [Job-1] ["Applied"][Email02] | Thread [Email02] [EmailLIST[NULL]] |
| USER01 | Email [EmailServer-01] [Email03]: Subject="Thank you for your application for Senior Brand & Content Strategist"; Sender=Enterprise@trm.brassring.com Content="Thank you for your interest and taking the time to apply for Senior Brand & Content Strategist 630220388 ...we have decided not to move forward at this time" | VirtualCategory [Job-2] ["Rejected"][Email03] | Thread [Email03] [EmailLIST[Email01]] |

FIG. 4

VIRTUALIZED EMAIL CONSOLIDATION AND CATEGORIZATION

BACKGROUND

The present disclosure relates to digital communications, and, more specifically, to dynamically managing and consolidating emails.

In many modern situations, email communication is a necessary and integral part of many aspects of modern work and personal situations. However, the sheer volume of emails received can lead to inbox clutter and make it challenging for the recipients to gather necessary and/or important information from all the various emails.

SUMMARY

Disclosed is a computer-implemented method to dynamically categorize email on a client device. The method includes identifying one or more email servers associated with a user. The method also includes, analyzing, for the user, a set of emails associated with the one or more email servers. The method further includes identifying, for each email, at least one category based on content of the email. The method includes generating, at least one virtualized folder, and consolidating, in response to the generating, the set of emails into the at least one virtualized folder by moving the emails into a folder based on a first of the at least one categories. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

The present disclosure relates to digital communications, and, more specifically, to dynamically managing and consolidating emails.

In many modern situations, email communication is a necessary and integral part of many aspects of modern work and personal situations. However, the sheer volume of emails received can lead to inbox clutter and make it challenging for the recipients to gather necessary and/or important information from all the various emails. This can be exacerbated if a user spends longer than typical time away from their email, such as during a vacation.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
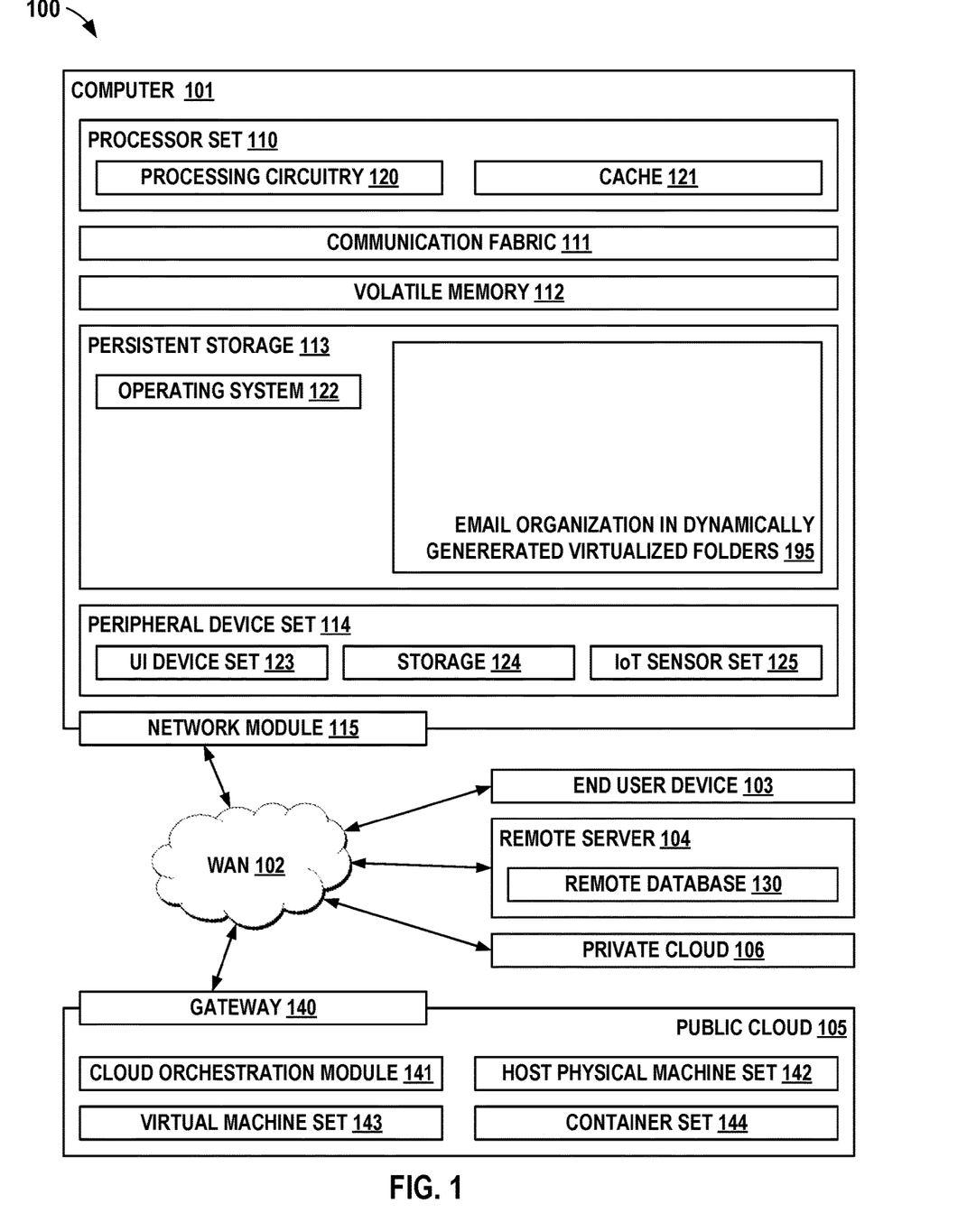
FIG. 1 is a block diagram of a computing environment suitable for generating and updating a display in a vehicle, in accordance with some embodiments of the present disclosure.

Computing environment 100 contains an example of an environment for the execution of at least some of the computer code involved in performing the inventive methods, such as email organization in dynamically generated virtualized in block 195. In addition to block 195, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 195, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 195 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 195 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In many modern situations, email communication is a necessary and integral part of many aspects of modern work and personal situations. However, the sheer volume of emails received can lead to inbox clutter and make it challenging for the recipients to gather necessary and/or important information from all the various emails. This can be exacerbated if a user spends longer than typical time away from their email, such as during a vacation.

In order to better provide a system to ensure proper prioritization of incoming information, embodiments of the present disclosure provide a virtualized email management system to dynamically categorize and organize incoming emails for a user.

Embodiments of the present disclosure can dynamically manage incoming and previously received emails from one or more servers. Embodiments of the present disclosure can include a virtual email manager.

In some embodiments, the virtual email manager accurately classifies emails into email folders. The email folders can be user defined and/or learned and dynamically generated. In some embodiments, the virtual email manager operates on a client device independent from the emails servers. All of the actions, categorizations, and/or sorting can be performed without changing or affecting server data. Virtualized folders can be created, and emails can be sorted into these folders, and then synced to the server and/or deleted when no longer needed.

In some embodiments, the virtual email manager can minimize inbox clutter by grouping and/or summarizing related emails. The grouping can be based on the virtualized/dynamically generated folders. In some embodiments, virtual email manager can identify and organize email threads. Emails threads can be one or more emails that are related. A thread can include direct response(s) to a first email. Additionally, threads can include separate emails that are not replies. For example, a common question to multiple people, or a follow up email to an original can be considered threads.

In some embodiments, the virtual email manager can highlight and/or otherwise mark/indicate changes and/or other relevant information from a chain of related emails. This can allow a user to quickly absorb the required information without having to review the entire set of emails or the entire email chain/family. For example, if a user is on vacation, an identified thread can have several emails related to a topic. The highlighting can indicate a conclusion and/or a highlight; thus, all emails in the thread do not need to be thoroughly reviewed by the user. In some embodiments, a thread can be a subset of the set of emails.

In some embodiments, the virtual email manager can be utilized on a client device. This can allow for access to multiple distinct email servers. The multiple servers for a single user can provide additional data for preferences and/or tendencies of the user which will increase the relevance of the virtualized folders. Additionally, the virtual email manager being implemented at the client device prevents a need to be integrated with the server, thereby reducing security and data integrity, and introducing other similar risks. Additionally, the virtual folders can be created and deleted at various intervals without intervention form the user. For example, a temporary influx of a category of emails can lead to the creation of a virtual folder. After a period of time, when the influx slows down, the virtual folder can be removed as it is no longer necessary. Additionally, if the change appears more permanent, the virtual folder can be synchronized with the server to become an actual folder.

In some embodiments, the virtual email manager is configured based on user preferences. The configuration can include providing access to one or more email servers/applications, defining preferred results (e.g., categorizing/consolidating/marking, etc.), and the like. In some embodiments, the virtual email manager learns user preferences and/or tendencies. The learning can include analyzing the settings, email history, current folders, and the like. In some embodiments, data from different users can be used to train the virtual email manager. The virtual email manager can include one or more different learning models. In some embodiments, the user can prompt synchronization, an analysis of emails, define a set of emails, and the like.

In some embodiments, the virtual email manager monitors email traffic in real time. The monitoring can include automatically moving emails into various virtualized folders. In some embodiments, the monitoring can lead to creation of new folders and/or additional sorting of previously organized items. In some embodiments, the monitoring is applied to a predefined set of emails. For example, the set can be all unread emails at a given time. In another example, the set of emails can be all emails that are received in a given time frame (e.g., a week, while out of office, etc.).

In some embodiments, the virtual email manager can identify and manage email threads. Email threads can include many different senders and recipients. It can be extremely difficult to track relevant information. In some embodiments, the virtual email manager can identify changes and/or branches in various email threads. The relevant information can include questions, answers, contradictions, updates, and the like. The identification of relevant information can save time in reviewing several emails. The relevant information can be highlighted or similarly indicated. Additionally, the virtual email manager can identify redundant information. Avoiding reading redundant information can save a large amount of time.

The aforementioned advantages are example advantages, and embodiments exist that can contain all, some, or none of the aforementioned advantages while remaining within the spirit and scope of the present disclosure.

Figure 2:
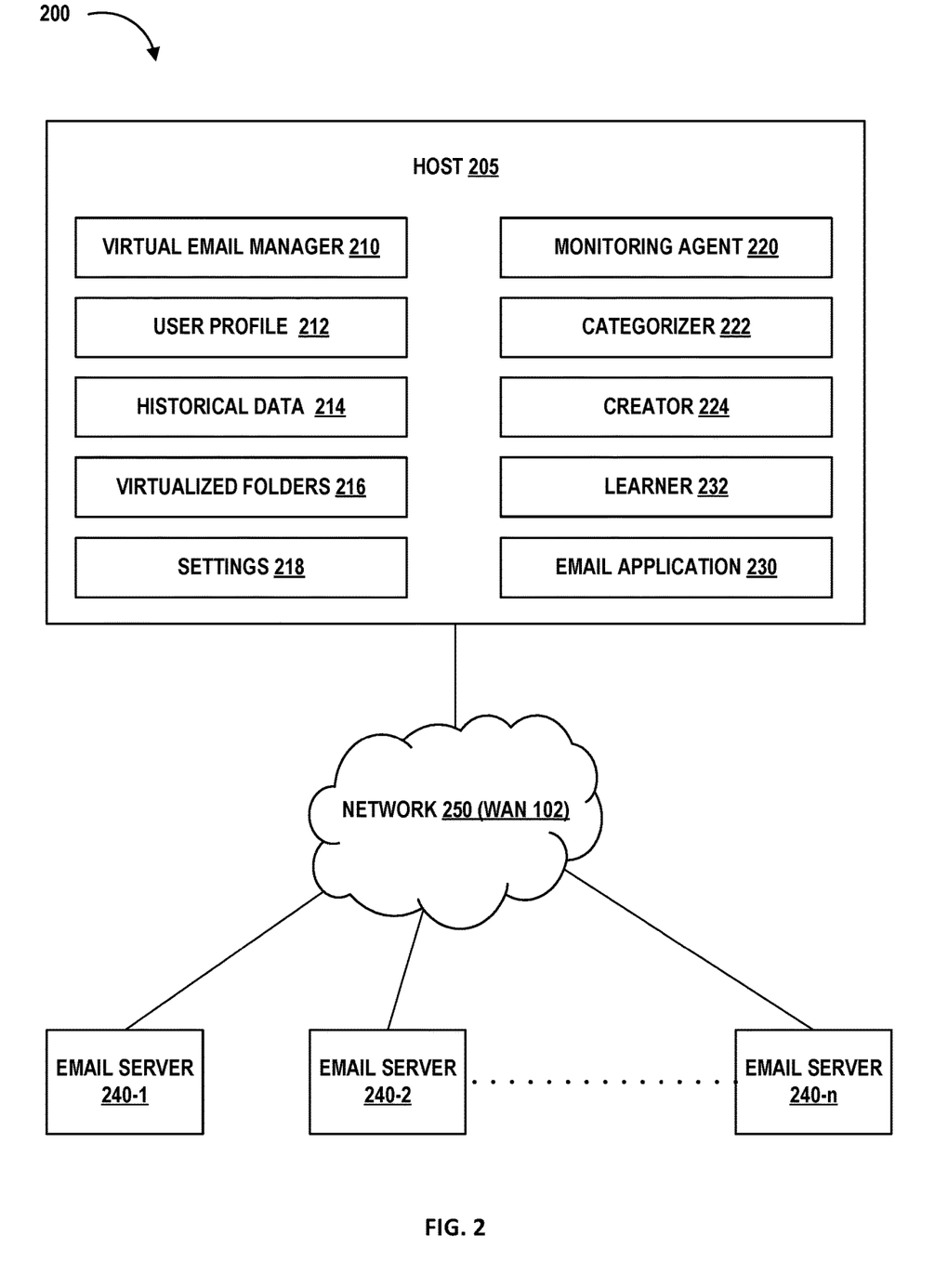
FIG. 2 is a block diagram of a computing environment suitable for operation of a virtual email manager, in accordance with some embodiments of the present disclosure.

Referring now to various embodiments of the disclosure in more detail, FIG. 2 is a representation of a computing environment 200, that is capable of running a virtual email manager in accordance with one or more embodiments of the present disclosure. Many modifications to the depicted environment may be made by those skilled in the art without departing from the scope of the disclosure.

Computing environment 200 includes host 205, email server 240(1), email server 240(2), up to email server 240(n), where n can be any whole number, and network 250, email server 240(1), email server 240(2), up to email server 240(n) can be referred as email server 240 individually, collectively, or severally. In some embodiments, there can be any number of email servers 240.

Network 250 can be, for example, a telecommunications network, a local area network (LAN), a wide area network (WAN), such as the Internet, or a combination of the three, and can include wired, wireless, or fiber optic connections. Network 250 may include one or more wired and/or wireless networks that are capable of receiving and transmitting data, voice, and/or video signals, including multimedia signals that include voice, data, and video information. In general, network 250 may be any combination of connections and protocols that will support communications between and among host 205, email servers 240, and other computing devices (not shown) within computing environment 200. In some embodiments, each of host 205, email servers 240, and other devices not shown may include one or more a computer system, such as computer 101 of FIG. 1.

Host 205 can be a standalone computing device, a management server, a web server, a mobile computing device, or any other electronic device or computing system capable of receiving, sending, and processing data. In other embodiments, host 205 can represent a server computing system utilizing multiple computers as a server system, such as in a cloud computing environment (e.g., cloud environment 105 or 106). In some embodiments, host 205 can be a client device for email server 240. Multiple email servers 240 can be accessed through host 205 for one or more users. In some embodiments, host 205 includes virtual email manager 210, user profile 212, historical data 214, virtualized folders 216, settings 218, monitoring agent 220, categorizer 222, creator 224, email application 230, and learner 232.

Virtual email manager 210 can be any combination of hardware and/or software configured to manage emails for a user on a client device. In some embodiments, virtual email manager 210 can manage emails for two or more servers simultaneously for a user. The client device can be a computing device such as host 205. In some embodiments, virtual email manager 210 dynamically configures virtual storage folders, sorts email, identifies redundant information and/or relevant/important information, and monitors for changes and/or branches of email chains and the like. Virtual email manager 210 can be located on a client device and perform all functions locally. In some embodiments, virtual email manager 210 can operate separate from the one or more email server 240. This can allow for processing and manipulation of data without affecting data integrity of and/or requiring access to email server 240. Additionally, it can provide additional information and insights into preferences and intents of the user by collecting and analyzing data from multiple different email servers 240 associated with the user.

In some embodiments, virtual email manager 210 includes one or more of user profile 212, historical data 214, virtualized folders 216, settings 218, monitoring agent 220, categorizer 222, creator 224, email application 230, and learner 232 in any combination. In some embodiments, other subcomponents of host 205 can be combined with various combinations of subcomponents in any combination. For example, in one embodiment, virtual email manager 210 can include user profile 212, historical data 214, virtualized folders 216, and settings 218. Monitoring agent 220 can be a separate module that includes categorizer 222, creator 224, and learner 232. While in another embodiment, monitoring agent 220 and the other subcomponents are all included in virtual email manager 210.

User profile 212 can be any combination of hardware and/or software configured to store information about one or more users of virtual email manager 210. In some embodiments, user profile 212 can include a configuration file. The configuration file can include one or more user preferences, and/or authentication information for email server 240. In some embodiments, a user can update user profile 212.

Settings 218 can be any combination of hardware and/or software configured to allow the user to set and/or update settings and rules in virtual email manager 210. Settings 218 can include authentication information to retrieve data from one or more email servers 240. In some embodiments, the updates can include which accounts to include, how/where to share data, preferences on number and type of files, types of indications, and the like.

Figure 4:
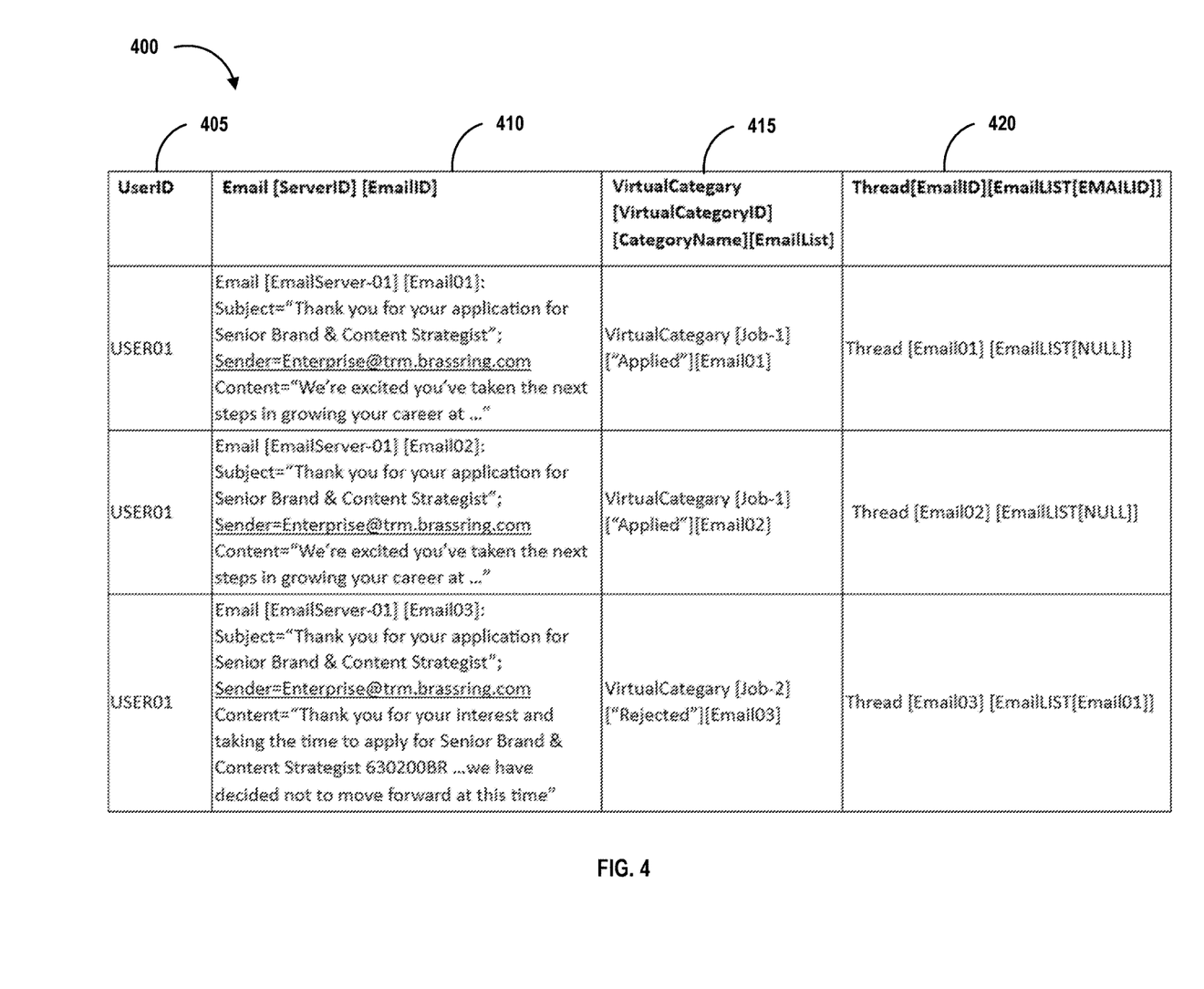
FIG. 4 is one example of email data to manage and sort email in virtualized folders on a client device, in accordance with some embodiments of the present disclosure.

Historical data 214 can be any combination of hardware and/or software configured to store data for one or more users. In some embodiments, historical data 214 can include previously accrued data about one or more users. The data can be related to how the user managers emails. For example, the data can include current folders (standard and self-generated), where emails are stored/sorted, when they are sorted, email filters, and the like. FIG. 4 described below includes one embodiment of what can be included in historical data 214.

Virtualized folders 216 can be any combination of hardware and/or software configured to store and/or organize emails. In some embodiments, virtualized folders 216 can include one or more categories. Each category can have one or more subcategories. In some embodiments, virtualized folders 216 are generated by virtual email manager 210. The number and titles of the categories and subcategories are based on analysis of one or more of user profile 212, historical data 214, and settings 218. In some embodiments, the generated folders are based on output of learner 232 and/or creator 224. In some embodiments, virtualized folders 216 can be pushed to update the permanent folders on email server 240. In some embodiments, virtualized folders 216 are temporary. For example, after a long vacation, the virtualized folders can be used until the user indicates they are no longer needed.

Monitoring agent 220 can be any combination of hardware and/or software configured to monitor and analyze emails. In some embodiments, monitoring agent 220 can monitor emails from one more email servers 240. The monitoring can be for newly incoming emails and/or for existing emails on email server 240. In some embodiments, monitoring agent 220 includes one or more of categorizer 222, creator 224, and learner 232 in any combination.

In some embodiments, monitoring agent 220 includes one or more learning models. The one or more learning models can be trained using data from one or more of settings within virtual email manager 210, user profile 212, historical data 214, and other similar data from different users. For example, in some embodiments, input trainings can include current folders, email stored in folders, analysis of the stored emails, emails that are not stored in the folders, number of folders, email chain, time spent reading/reviewing emails, use of folders, calendar information (e.g., extended vacation, holiday, meeting schedule, location (e.g., home office, primary office, remote location, etc.), email server (e.g., personal email, work email, etc.), and the like. In some embodiments, the one or more learning models can use some or all of the training inputs as inputs. The output can include one or more of the outputs of categorizer 222, creator 224, and learner 232. In some embodiments, the output includes generating virtualized folders 216, and or sending various emails to a relevant virtualized folder. In some embodiments, the output can include highlighting relevant portions of an email, such as differences from previous email in and/or highlights of an email chain. In some embodiments, monitoring agent 220 and/or a set of subcomponents can be located on a different computing device (not shown). The different computing device can be specially configured to train and/or execute the one or more learning models. In some embodiments, host 205 can be specially configured to train and/or execute the one or more learning models.

In some embodiments, monitoring agent 220 may execute machine learning on data from the environment using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR). In some embodiments, monitoring agent 220 may execute machine learning using one or more of the following example techniques: principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), region-based convolution neural networks (RCNN), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Categorizer 222 can be any combination of hardware and/or software configured to categorize/sort emails. In some embodiments, categorizer can include and/or utilize one or more learning models. In some embodiments, categorizer 222 can analyze incoming and existing emails. The analysis can include natural language processing (NLP). Categorizer 222 can identify one or more topics/categories for each email. In some embodiments, categorizer 222 sends the emails to virtualized folders 216. In some embodiments, the analysis includes calculating a confidence score for each of the identified topics/categories. The categorization can be based on the confidence scores and/or, any relationship to other analyzed emails. Said differently, the confidence scores can be adjusted based on identified correlations with other emails. The categorization can be based on one or more of sender, topic, substance, one or more keywords, additional recipients, location in the chain (first email in chain, etc.), and the like. In some embodiments, the categorization can be done before and/or after virtualized folders 216 are created. In some embodiments, the categorization is performed as emails arrive from email server 240.

Creator 224 can be any combination of hardware and/or software configured to identify and/or create categories for emails. The categories can be used for a title and/or for organizing categories and subcategories of virtual folders 216. In some embodiments, creator 224 can include one or more learning models. In some embodiments, creator 224 can analyze one or more of user profile 212, historical data 214, and incoming emails to identify one or more categories. The created categories can be based on existing folders. For example, the folder can be present in a different email server for the user. In another example, the created category/folder can be a subcategory of an existing folder. In some embodiments, creator 224 can identify/create threads. The identification can include creating for the identified thread.

Learner 232 can be any combination of hardware and/or software configured to determine patterns and preferences of a user. In some embodiments, learner 232 include/utilizes one or more learning models. In some embodiments, learner 232 analyzes current folders, use of the folders, and other similar habits and conventions of the user. In some embodiments, learner 232 can incorporate data from one or more different users. Learner 232 can be configured to optimize the set of folders based on predicted uses, frequency of use, and/or frequency of emails in their respective categories.

Email application 230 can be any combination of hardware and/or software configured to provide an interface to access emails on email server 240. In some embodiments email application at 230 can provide access to multiple servers of email server 240 for a common user. In some embodiments, each email server 240 has a unique email application 230. In some embodiments, email application 230 can be integrated with virtual email manager 210. The integration can allow virtual email manager 210 to display emails sorted into virtualized folders 216. In some embodiments, email application 230 can update the actual folders to match virtualized folders 216 on email server 240.

Email server 240 can be any combination of hardware and/or software configured to manage incoming and outgoing email to one or more accounts. In some embodiments, email server 240 can send email data to one or more client devices. In some embodiments, email server 240 can sync actual folders to match virtualized folder 216 and/or sort associated emails with the virtualized folders.

Figure 3:
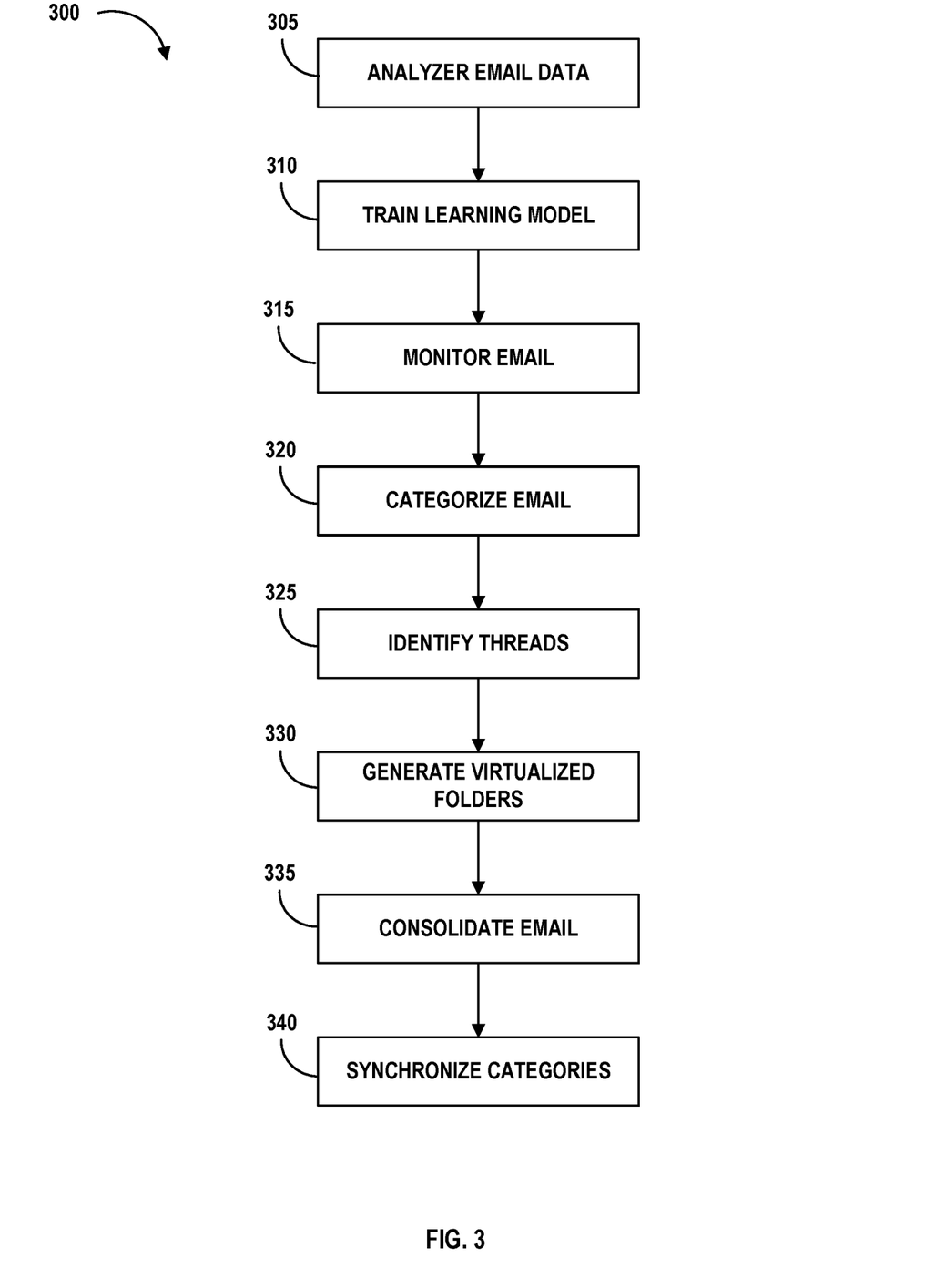
FIG. 3 is a flow chart of an example method to manage and sort email in virtualized folders on a client device, in accordance with some embodiments of the present disclosure.

FIG. 3 is a flowchart of an example process 300 for dynamic email management at a client interface level that can be performed in a computing environment (e.g., computing environment 100 and/or computing environment 200). One or more of the advantages and improvements described above for dynamic email management at a client interface level may be realized by process 300, consistent with various embodiments of the present disclosure.

Process 300 can be implemented by one or more processors, host 205, virtual email manager 210, user profile 212, historical data 214, virtualized folders 216, settings 218, monitoring agent 220, categorizer 222, creator 224, learner 232, email application 230, email server 240, and/or a different combination of hardware and/or software. In various embodiments, the various operations of process 300 are performed by one or more of host 205, virtual email manager 210, user profile 212, historical data 214, virtualized folders 216, settings 218, monitoring agent 220, categorizer 222, creator 224, learner 232, email application 230, and/or email server 240. For illustrative purposes, process 300 will be described as being performed by virtual email manager 210.

At operation 305, virtual email manager 210 analyzes email data. The analysis can include looking at one or more email server 240, methods of organization, use folders, number of folders, time emails are read, and the like. The analyzed data can be stored locally on host 205 and/or remotely on email server 240. During the analysis, no data is changed. In some embodiments, the analysis can include building and/or reviewing user profile 212, historical data 214, and settings 218. In some embodiments, the analysis is performed by one or more of monitoring agent 220 and/or learner 232. In some embodiments, the analysis is stored in one or more data formats. FIG. 4, described below, shows one potential embodiment of data analysis and storage.

In some embodiments, a set of email is analyzed. The set of email can be any number of emails. In some embodiments, the set of email is all emails for a user on email server 240. In some embodiments, the set of emails can be based on a period of time. For example, the set can be all emails received in a predetermined time period (e.g., week, vacation, etc.). In some embodiments, the set of email can be newly incoming emails and/or previously received emails.

At operation 310, virtual email manager 210 trains one or more learning models. In some embodiments, the training can be part of operation 305. In some embodiments, the training can be configured to assign one or more categories to each email, generate categories, identify email threads, create virtualized folders 216, store/sort emails in the virtualized folder 216, and the like. In some embodiments, the models are updated as new data and/or feedback is received. In some embodiments, the training data comprises information stored in one or more of user profile 212, historical data 214, settings 218, and email data from email server 240.

At operation 315, virtual email manager 210 monitors email servers. In some embodiments, the monitoring can be for one or more servers. In some embodiments, the monitoring includes only incoming new emails. In some embodiments, the monitoring includes reviewing all emails. In some embodiments, the monitoring can be for a period of time. For example, after a user is away from email for a period of time (e.g., vacation), the monitoring can be performed on the emails received during that period.

At operation 320, virtual email manager 210 categorizes each email. In some embodiments, each email can be assigned to one or more categories. The categories can be based on analysis of the content, sender, time, subject, other recipients, and the like. In some embodiments, the categorization includes assigning one or more categories to each email. Each assigned category can have an associated weight. The weight represents the likelihood the email is associated with the category and/or a relevance of the category within the email. The relevance can mean whether the category is an important factor within the scope of the email and/or to the user. In some embodiments, each category can include two different scores: one score as a relevance confidence score, and one score related to a confidence in the categories is correct. In some embodiments, the categorized are determined by categorizer 222.

At operation 325, virtual email manager 210 identifies email threads. In some embodiments, the email threads can include duplicate, similar, sequential, and/or emails that are otherwise related. In some embodiments, the threads are based on one or more of the identified categories for the emails. In some embodiments, the relation can be based on similar phrases/topics. For example, a job title in both an email that confirms a job application was submitted and one that requests an interview can be related. In some embodiments, each thread can be a subset of the set of emails that are analyzed. The subset can include two or more emails from the set of emails.

At operation 330, virtual email manager 210 generates virtualized folders 216. In some embodiments, the generated virtualized folders 216 are generated based on the identified categories and/or threads. There can be any number of folders generated. For example, a folder for each identified thread and/or category can be generated. In some embodiments, the generation includes generating a structure for the folders. The structure can include headings, folders, subfolders, and the like.

At operation 335, virtual email manager 210 consolidates the emails. In some embodiments, the consolidation is performed by categorizer 222. Categorizer 222 can move the emails into one of the generated virtualized folders 216. The consolidation can be based on one or more of threads and/or categories. In some embodiments, the consolidation can be based on circumstances. For example, if a use is on/retuning from vacation, the consolidation can be based on organizing tasks and identifying and summarizing relevant information. However, if it is a more standard day, the consolidation can be based on organizing for daily work.

At operation 340, virtual email manager 210 synchronizes the folders. In some embodiments, the synchronization includes pushing the sorted emails from the local virtual folders to email server 240. The updating can be performed as if the user manually adjusted all folders and placed each email into each folder. In some embodiments, the synchronization can include updating the folders on email server 240. In some embodiments, the updates are in response to a user approving the results. In some embodiments, the synchronization includes deleting any new generated virtualized folders 216—for example, in a scenario where a user was on vacation and used the virtual folders to catch up. Virtual email manager 210 can delete all virtualized folders and use the standard email application to display all data from email server 240.

FIG. 4 displays one embodiment 400 of analyzing and/or categorizing emails. Column 405 is a user identifier. Multiple users' data can be used to train the one or more learning models. The user identities are important in order to learn preferences and generate patterns and trends across multiple users. Column 410 includes email data. This can include server 240, subject, sender, content, and other information data for each email. Column 415 can include one or more identified categories. Column 420 can include one or more identified threads/lists relevant to the email. In various embodiments, one or more additional columns can be included with additional relevant information, such as confidence score, relevance scores, virtualized folders 216, and other similar data. In some embodiments, one of more of the columns can be in input for training, and/or an output of the learning models.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    identifying one or more email servers associated with a user;
    analyzing, for the user, a set of emails associated with the one or more email servers;
    identifying, for each email, at least one category based on content of the email;
    generating at least one virtualized folder; and
    consolidating, in response to the generating, the set of emails into the at least one virtualized folder by moving the emails into a folder based on a first of the at least one categories.

2. The computer-implemented method of claim 1, wherein the at least one virtualized folder is present only on a client device.

3. The computer-implemented method of claim 2, wherein the at least one virtualized folder is different than set of real folders associated with a first email server of the one or more email servers.

4. The computer-implemented method of claim 1, further comprising:
    training, in response to the analyzing, and based on the analyzing, one or more learning models, wherein the generating is performed by the one or more learning models.

5. The computer-implemented method of claim 3, further comprising:
    synchronizing the generated virtualized folders into the set of real folders.

6. The computer-implemented method of claim 1, further comprising:
    monitoring incoming emails; and
    sorting the incoming emails in one of the at least one of the virtualized folders.

7. The computer-implemented method of claim 1, wherein the generating does not change any data on the one or more email servers.

8. The computer-implemented method of claim 1, wherein the analyzing further comprises:
identifying a first thread comprising a first subset of emails from the set of emails.

9. The computer-implemented method of claim 8, further comprising:
identifying, in the first thread, a topic; and
marking a conclusion of the thread.

10. The computer-implemented method of claim 1, wherein the set of emails are predetermined based on a buildup of unread emails on the first email server, the method further comprising:
deleting, the virtualized folders conditioned upon the buildup being reduced a buildup threshold.

11. A system comprising:
a processor; and
a computer-readable storage medium communicatively coupled to the processor and storing program instructions which, when executed by the processor, are configured to cause the processor to:
identify one or more email servers associated with a user;
analyze, for the user, a set of emails associated with the one or more email servers;
identify, for each email, at least one category based on content of the email;
generate, at least one virtualized folder; and
consolidate, in response to the generating, the set of emails into the at least one virtualized folder by moving the emails into a folder based on a first of the at least one categories.

12. The system of claim 11, wherein the at least one virtualized folder is present only on a client device.

13. The system of claim 11, wherein the program instructions are further configured to cause the processor to:
monitor incoming emails; and
sort the incoming emails in one of the at least one of the virtualized folders.

14. The system of claim 11, wherein the analyzing further configured to identify a first thread comprising a first subset of emails from the set of emails.

15. The system of claim 14, wherein the program instructions are further configured to cause the processor to:
identify, in the first thread, a topic; and
mark a conclusion of the thread.

16. A computer program product, the computer program product comprising a computer readable storage medium having program instructions embodied therewith, the program instructions executable by a processing unit to cause the processing unit to:
identify one or more email servers associated with a user;
analyze, for the user, a set of emails associated with the one or more email servers;
identify, for each email, at least one category based on content of the email;
generate, at least one virtualized folder; and
consolidate, in response to the generating, the set of emails into the at least one virtualized folder by moving the emails into a folder based on a first of the at least one categories.

17. The computer program product of claim 16, wherein the at least one virtualized folder is present only on a client device.

18. The computer program product of claim 16, wherein the program instructions are further configured to cause the processing unit to:
monitor incoming emails; and
sort the incoming emails in one of the at least one virtualized folder.

19. The computer program product of claim 16, wherein the analyzing further configured to identify a first thread comprising a first subset of emails from the set of emails.

20. The computer program product of claim 19, wherein the program instructions are further configured to cause the processing unit to:
identify, in the first thread, a topic; and
mark a conclusion of the thread.

* * * * *